United States Patent [19]
Hara et al.

[11] Patent Number: 5,244,989
[45] Date of Patent: Sep. 14, 1993

[54] METHOD FOR PRODUCING A STEREOSPECIFIC POLYOLEFIN

[75] Inventors: Daiji Hara; Morihiko Sato, both of Yokkaichi; Mitsuhiro Mori, Aichi; Yozo Kondo, Yokkaichi, all of Japan

[73] Assignee: Tosoh Corporation, Shinnanyo, Japan

[21] Appl. No.: 841,508

[22] Filed: Feb. 26, 1992

[30] Foreign Application Priority Data

Mar. 22, 1991 [JP] Japan .................................. 3-81259

[51] Int. Cl.$^5$ ...................... C08F 4/651; C08F 4/654; C08F 10/00
[52] U.S. Cl. .................................. 526/119; 526/124; 526/128; 526/134; 526/351; 526/348; 502/113; 502/125
[58] Field of Search ................. 526/119, 124, 128, 134

[56] References Cited

U.S. PATENT DOCUMENTS

| | | | |
|---|---|---|---|
| 4,472,521 | 9/1984 | Band | 526/119 |
| 4,748,221 | 5/1988 | Collomb et al. | 526/125 |
| 4,904,630 | 2/1990 | Matsuura et al. | 526/119 |
| 5,053,467 | 10/1991 | Kondo et al. | 526/119 |
| 5,077,250 | 12/1991 | Miyoshi et al. | 526/119 |

FOREIGN PATENT DOCUMENTS

| | | |
|---|---|---|
| 0060443 | 9/1982 | European Pat. Off. |
| 0275317 | 7/1988 | European Pat. Off. |
| 0376145 | 7/1990 | European Pat. Off. |
| 0474157A1 | 3/1992 | European Pat. Off. |

OTHER PUBLICATIONS

WO 87/07899.

Primary Examiner—Joseph L. Schofer
Assistant Examiner—David Wu
Attorney, Agent, or Firm—Oblon, Spivak, McClelland, Maier & Neustadt

[57] ABSTRACT

A method for producing a stereospecific polyolefin in the presence of a catalyst comprising a transition metal compound and an organometallic compound, wherein a catalyst system is used which comprises: (A) a solid catalyst component prepared by reacting (i) a homogeneous solution prepared by reacting (i-1) magnesium and a hydroxylated organic compound, (i-2) an oxygen-containing organic compound of titanium and/or (i-3) an oxygen-containing organic compound of silicon, with an oxygen-containing organic compound of aluminum and/or a boron compound, with (ii) at least one aluminum halide compound to obtain a solid product, reacting to this solid product (iii) an electron-donative compound and (iv) a titanium halide compound to obtain a solid component, and further reacting to this solid component (v) silicon tetrachloride and/or an alkyl-substituted product of silicon tetrachloride, (B) at least one member selected from the group consisting of organometallic compounds of Groups IA, IIA, IIB, IIIB and IVB of the Periodic Table, and (C) an electron-donative compound.

13 Claims, No Drawings

METHOD FOR PRODUCING A STEREOSPECIFIC POLYOLEFIN

This invention relates to a method for producing a stereospecific polyolefin. More particularly, this invention relates to a method which is capable of producing a highly stereospecific polymer having a good configuration of particles in good yield by using a specific catalyst in the (co)polymerization of an α-olefin having at least three carbon atoms.

Heretofore, as a catalyst for polymerization of olefins, α-type titanium trichloride obtained by reducing titanium tetrachloride with hydrogen, purple γ-type titanium trichloride obtained by reducing titanium tetrachloride with aluminum or δ-type titanium trichloride obtained by pulverizing such titanium trichloride by a ball mill, has been known. Further, as a method for modifying such catalysts, it is known to subject them to mixing and pulverizing treatment together with various modifying agents. However, when such catalysts were used for polymerization, the polymerization activities were low, and the catalyst residues in the resulting polymers were substantial, whereby a so-called deashing step was necessary. Further, in recent years, many proposals have been made for the production of a solid catalyst component composed essentially of magnesium, titanium and halogen. However, in many of them, further improvements are desired with respect to the catalytic activities or the stereospecificity, powder properties, etc of the polymers.

The present inventors have previously proposed methods for obtaining stereospecific polyolefins in good yield by means of certain specific solid catalyst components comprising magnesium, titanium and halogen as the main components in Japanese Unexamined Patent Publications No. 3007/1988, No. 314210/1988, No. 317502/1988, No. 105/1989 and No. 165608/1989. In these methods, however, the stereospecificity of the resulting polymers was sometimes still inadequate.

The present inventors have conducted extensive researches to overcome such an inadequacy, i.e. to find out a way to improve the stereospecificity.

As a result, the present invention has been accomplished by using in the method described in e.g. the above-mentioned Japanese Unexamined Patent Publication No. 105/1989, a solid catalyst component prepared by reacting silicon tetrachloride and/or an alkyl-substituted product of silicon tetrachloride to a solid component prepared by reacting an electron-donative compound and a titanium halide compound to a solid product obtained by reacting at least one aluminum halide to a homogeneous solution comprising magnesium, titanium and/or silicon, and as co-catalysts, an organometallic compound and an electron-donative compound.

Thus, the present invention provides a method for producing a stereospecific polyolefin in the presence of a catalyst comprising a transition metal compound and an organometallic compound, wherein a catalyst system is used which comprises:

(A) a solid catalyst component prepared by reacting
(i) a homogeneous solution prepared by reacting
(i-1) magnesium and a hydroxylated organic compound,
(i-2) an oxygen-containing organic compound of titanium and/or
(i-3) an oxygen-containing organic compound of silicon, with an oxygen-containing organic compound of aluminum and/or a boron compound, with
(ii) at least one aluminum halide compound to obtain a solid product, reacting to this solid product
(iii) an electron-donative compound and
(iv) a titanium halide compound to obtain a solid component, and further reacting to this solid component
(v) silicon tetrachloride and/or an alkyl-substituted product of silicon tetrachloride,
(B) at least one member selected from the group consisting of organometallic compounds of Groups IA, IIA, IIB, IIIB and IVB of the Periodic Table, and
(C) an electron-donative compound.

Now, the present invention will be described in detail with reference to the preferred embodiments.

The solid catalyst component (A) to be used in the present invention, can be prepared by reacting
(i) a homogeneous solution prepared by reacting
(i-1) magnesium and a hydroxylated organic compound,
(i-2) an oxygen-containing organic compound of titanium and/or
(i-3) an oxygen-containing organic compound of silicon, with an oxygen-containing organic compound of aluminum and/or a boron compound, with
(ii) at least one aluminum halide compound to obtain a solid product, reacting to this solid product
(iii) an electron-donative compound and
(iv) a titanium halide compound to obtain a solid component, and further reacting to this solid component
(v) silicon tetrachloride and/or an alkyl-substituted product of silicon tetrachloride.

The method for preparing the homogeneous solution for the above component (i) has been proposed and described in detail by the present inventors in e.g. Japanese Unexamined Patent Publications No. 105/1989, No. 173010/1990 and No. 28204/1991.

A homogeneous solution containing magnesium, a hydroxylated organic compound and titanium may be prepared, for example, by reacting metal magnesium, a hydroxylated organic compound and an oxygen-containing organic compound of titanium such as a titanium alkoxide. In such a case, metal magnesium and a hydroxylated organic compound for the above-mentioned reactant (i-1) may preliminarily be reacted before use.

Metal magnesium can take any form such as powdery form, granular form, foil form, and ribbon form.

As the hydroxylated organic compound, alcohols, phenols and organosilanols are suitable.

As the alcohols, linear or branched aliphatic alcohols having 1 to 18 carbon atoms or alicyclic or aromatic alcohols can be used. Specific examples include methanol, ethanol, n-propanol, i-propanol, n-butanol, n-hexanol, 2-ethylhexanol, n-octanol, i-octanol, n-stearyl alcohol, cyclopentanol, cyclohexanol, and ethylene glycol.

Further, the phenols include, for example, phenol, cresol, xylenol and hydroquinone.

The organosilanols are those having at least one hydroxyl group and an organic group selected from an alkyl group with 1 to 12, preferably 1 to 6, carbon atoms, a cycloalkyl group, an arylalkyl group, an aryl group, and an alkylaryl group. For example, trimethylsilanol, triethylsilanol, triphenylsilanol, and t-butyldimethylsilanol may be mentioned.

These hydroxylated organic compounds can be used alone or as a mixture of two or more of them.

As the oxygen-containing organic compound of titanium for the above-mentioned reactant (i-2), a compound of the formula $[O_pTi_u(OR^1)_q]_n$ is used. In this formula $R^1$ is a hydrocarbon group having from 1 to 20 carbon atoms, preferably from 1 to 10 carbon atoms. As such a hydrocarbon group, a linear or branched alkyl group, a cycloalkyl group, an arylalkyl group, an aryl group and an alkylaryl group may be mentioned. In the formula, p, q and u are numbers satisfying $p \geq 0$, $q > 0$, $u \geq 1$ and agreeable with the valence of Ti, and n is an integer. It is particularly preferred to use an oxygen-containing organic compound of titanium wherein $0 \leq p \leq 1$, $1 \leq u \leq 2$ and $1 \leq n \leq 6$.

Specific examples include titanium tetraethoxide, titanium tetra-n-propoxide, titanium tetra-i-propoxide, titanium tetra-n-butoxide and hexa-i-propoxy dititanate. Use of several oxygen-containing organic compounds of titanium having different hydrocarbon groups is included in the scope of the present invention. These oxygen-containing organic compounds of titanium may be used alone or may be used by mixing or reacting two or more of them.

In addition, it is preferable to add one or more substances that will react with metal magnesium or form an adduct during the reaction, e.g. polar substances such as iodine, mercuric chloride, halogenated alkyls, and organic acids.

A homogeneous solution obtainable by reacting magnesium, a hydroxylated organic compound, oxygen-containing organic compounds of silicon and aluminum, and/or a boron compound, may be prepared, for example, by reacting metal magnesium, a hydroxylated organic compound and an oxygen-containing organic compound of silicon such as a silicon alkoxide with an oxygen-containing organic compound of aluminum such as an aluminum alkoxide and/or a boron compound such as a boron alkoxide or an alkyl boron. If it is necessary to control the particle size of the catalyst, the above-mentioned oxygen-containing organic compound of titanium may be added.

As the oxygen-containing organic compound of silicon for the reactant (i-3), the same oxygen containing organic compound of silicon as described hereinafter for component (C) may be used.

As the oxygen-containing organic compound of aluminum, an oxygen-containing organic compound of the formula $Al(OR^2)_dX_{3-d}$ is used. In the formula, $R^2$ is a hydrocarbon group having from 1 to 20 carbon atoms, preferably from 1 to 10 carbon atoms. As such a hydrocarbon group, a linear or branched alkyl group, a cycloalkyl group, an arylalkyl group, an aryl group and an alkylaryl group, may be mentioned. In the formula, d is a number of $0 < d \leq 3$, and X is a halogen atom.

Specific examples of the oxygen-containing organic compound of aluminum, include trimethoxy aluminum, triethoxy aluminum, tri-n-propoxy aluminum, tri-i-propoxy aluminum, tri-n-butoxy aluminum, tri-sec-butoxy aluminum, tri-tert-butoxy aluminum, tri(2-ethylhexoxy)aluminum, triphenoxy aluminum, tribenzyloxy aluminum, dichloromethoxy aluminum, chlorodimethoxy aluminum, dichloro(2-ethylhexoxy) aluminum, chlorodi(2-ethylhexoxy) aluminum, dichlorophenoxy aluminum and chlorodiphenoxy aluminum. Use of several oxygen-containing organic compounds of aluminum having different hydrocarbon groups is also included in the scope of the present invention. These oxygen-containing organic compounds of aluminum may be used alone or in combination as a mixture of two or more of them.

As the boron compound, a boron compound of the formula $R^3{}_eB(OR^4)_gX_{3-(e+g)}$ is used. In the formula, each of $R^3$ and $R^4$ is a hydrocarbon group having from 1 to 20, preferably from 1 to 10, carbon atoms such as a linear or branched alkyl group, a cycloalkyl group, an arylalkyl group, an aryl group or an alkylaryl group, a halogenated hydrocarbon group, an amino group-substituted hydrocarbon group, or a hydrogen atom, e and g are numbers satisfying $0 \leq e \leq 3$, $0 \leq g \leq 3$, and $0 \leq +g \leq 3$, and X is a halogen atom.

Specific examples of the boron compound include trimethoxyborane, triethoxyborane, tri-n-propoxyborane, tri-i-propoxyborane, tri-n-butoxyborane, tri-i-butoxyborane, butoxyborane, tri-sec-butoxyborane, tri-tert-butoxyborane, tri(2-ethylhexoxy)borane, triphenoxyborane, tribenzyloxyborane, di-i-propoxymethylborane, di-i-propoxyphenylborane, 2-aminoethyldiphenylborane, trimethylene borate (an ester of 1-3-propanediol with boric acid), butyl borate, triethylborane, tri-n-butylborane, tri-i-butylborane, tri-sec-butylborane, tri-sec-isoamylborane, triphenylborane, trimesitylborane, tris(4-fluorophenyl)borane, B-isopinocamphenyl-9-borabicyclo(3,3,1)nonane, 9-borabicyclo(3,3,1)nonane, di-sec-isoamylborane, chlorodiethoxyborane, dichloroethoxyborane, bromodiethylborane, trichloroborane and tribromoborane. Use of boron compounds having different substituents is also included in the scope of the present invention. These boron compounds may be used alone or in combination as a mixture of two or more of them.

As the aluminum halide compound for the above-mentioned reactant (ii), those represented by the general formula $AlR^5{}_rX_{3-r}$ may be used. In the formula, $R^5$ represents a hydrocarbon group having from 1 to 20 carbon atoms, X represents a halogen atom, and r is a number of $0 < r \leq 2$. It is preferable that $R^5$ is selected from a linear or branched alkyl group, an alkoxy group, a cycloalkyl group, an arylalkyl group, an aryl group and an alkylaryl group.

The above aluminum halide compounds may be used alone or as a mixture of two or more of them.

Specific examples of the aluminum halide compound include, for example, ethylaluminum dichloride, n-propylaluminum dichloride, n-butylaluminum dichloride, i-butylaluminum dichloride, ethylaluminum sesquichloride, i-butylaluminum sesquichloride, i-propylaluminum sesquichloride, n-propylaluminum sesquichloride, diethylaluminum chloride, di-i-propylaluminum chloride, di-n-propylaluminum chloride, di-i-butylaluminum chloride, diethylaluminum bromide, and diethylaluminum iodide.

As the electron-donative compound for the above-mentioned reactant (iii), ethers, esters, ketones, phenols, amines, amides, imines, nitriles, phosphines, phosphites, stibines, arsines, phosphoryl amides and alcoholates may be mentioned.

Among them, esters are preferred, and organic esters are most preferred.

As the organic esters, mono or diester of an aromatic carboxylic acid, mono or diester of an aliphatic carboxylic acid and the like may be mentioned.

Specific examples include, for example, butyl formate, ethyl acetate, butyl acetate, isobutyl isobutyrate, propyl pivalate, isobutyl pivalate, ethyl acrylate, methyl methacrylate, ethyl methacrylate, isobutyl methacrylate, diethyl malonate, diisobutyl malonate, diethyl succinate, dibutyl succinate, diisobutyl succinate, diethyl glutarate, dibutyl glutarate, diisobutyl glutarate, diisobutyl adipate, dibutyl sebacate, diethyl maleate, dibutyl maleate, diisobutyl maleate, monomethyl fumarate, diethyl fumarate, diisobutyl fumarate, diethyl tartarate, dibutyl tartarate, diisobutyl tartarate, methyl benzoate, ethyl benzoate, methyl p-toluate, ethyl p-toluate, ethyl p-tert butylbenzoate, ethyl p-anisate, isobutyl α-naphthoate, ethyl cinnamate, monomethyl phthalate, dibutyl phthalate, diisobutyl phthalate, dihexyl phthalate, dioctyl phthalate, di-2-ethylhexyl phthalate, diallyl phthalate, diphenyl phthalate, diethyl isophthalate, diisobutyl isophthalate, diethyl terephthalate, dibutyl terephthalate, diethyl naphthalate and dibutyl naphthalate. Such electron donative compounds (iii) may be used alone or in combination as a mixture of two or more of them.

As the titanium halide compound for the above-mentioned reactant (iv), compounds represented by the general formula $Ti(OR^6)_f X_{4-f}$ may be used. In the formula, $R^6$ represents a hydrocarbon group having 1 to 20 carbon atoms, X is a halogen atom and f is a number of $0 \leq f < 4$. $R^6$ is preferably selected from a linear or branched alkyl group, an alkoxy group, a cycloalkyl group, an arylalkyl group, an aryl group and an alkylaryl group. The above-mentioned titanium halide compounds may be used alone or in combination as a mixture of two or more of them.

Specific examples of the titanium halide compound include, for example, titanium tetrachloride, ethoxy titanium trichloride, propoxy titanium trichloride, butoxy titanium trichloride, phenoxy titanium trichloride, diethoxy titanium dichloride and triethoxy titanium chloride.

As the silicon tetrachloride and/or the alkyl-substituted product of silicon tetrachloride for the above reactant (v), a silicon compound of the formula $R^7_n SiCl_{4-n}$ may be employed. In the formula, $R^7$ is an alkyl group having having from 1 to 20 carbon atoms, and n is a number of $0 \leq n < 4$. Such silicon halide compounds may be used alone or as a mixture of two or more of them.

Specific examples of the silicon tetrachloride and/or the alkyl-substituted product of silicon tetrachloride include, for example, tetrachlorosilane, methyltrichlorosilane, ethyltrichlorosilane, propyltrichlorosilane, butyltrichlorosilane, isobutyltrichlorosilane, hexyltrichlorosilane, cyclohexyltrichlorosilane, octyltrichlorosilane, decyltrichlorosilane, tetradecyltrichlorosilane, eicosyltrichlorosilane, 2-trichlorosilylnorbornane, dimethyldichlorosilane, diethyldichlorosilane, dibutyldichlorosilane, dihexyldichlorosilane, methylpropyldichlorosilane, ethylmethyldichlorosilane, butylmethyldichlorosilane, cylohexylmethyldichlorosilane, methyloctyldichlorosilane, dodecylmethyldichlorosilane, triethylchlorosilane, trihexylchlorosilane and dimethyloctylchlorosilane.

These reactions are preferably conducted in a liquid medium. For this purpose, especially when these reactants are not liquid under the operational conditions or the amount of liquid reactants is inadequate, these reactions should be conducted in the presence of an inert organic solvent.

As such an inert organic solvent, any solvent commonly used in this technical field may be employed, and aliphatic, alicyclic or aromatic hydrocarbons or halogenated derivatives or mixtures thereof may be employed. For example, isobutane, pentane, isopentane, hexane, heptane, cyclohexane, benzene, toluene, xylene, chlorobenzene, 1,2-dichlorobenzene, 1,3-dichlorobenzene, benzyl chloride, methylene dichloride, 1,2-dichloroethane, 1,3-dichloropropane, 1,4-dichlorobutane, 1,1,1-trichloroethane, 1,1,2-trichloroethane, 1,1,1,2-tetrachloroethane, 1,1,2,2-tetrachloroethane, tetrachloroethylene, carbon tetrachloride or chloroform may be mentioned. These organic solvents may be used alone or in combination as a mixture. When a halogen derivative or a mixture of halogen derivatives is used, good results may sometimes be obtainable with respect to the polymerization activities and the stereospecificity of the polymer.

There is no particular restriction as to the amounts of the reactants (i), (ii), (iii), (iv) and (v) to be used in the present invention. However, it is preferred to select the amounts of the reactants so that the ratio of the magnesium atom in the reactant (i) to the aluminum atom in the aluminum halide (ii) will be within a range of from 1:0.1 to 1:100, preferably from 1:0.1 to 1:20. If the ratio of the aluminum atom increases beyond this range, the catalytic activities tend to be low, or it tends to be difficult to obtain good powder properties. On the other hand, if it is too small, it may sometimes be difficult to obtain good powder properties.

It is preferred to select the amounts so that the molar ratio of the magnesium atom in the reactant (i) to the electron-donative compound (iii) will be from 1:0.05 to 1:5.0, preferably from 1:0.1 to 1:2.0. If the molar ratio is outside this range, a problem may arise such that the polymerization activities tend to be low, or the stereospecificity of the polymer tends to be low.

Further, it is preferred to select the amount of the reactant (iv) so that the molar ratio of the magnesium atom in the reactant (i) to the titanium halide compound (iv) will be within a range of from 1:1 to 1:100, preferably from 1:3 to 1:50. If the ratio is outside this range, a problem may arise such that the polymerization activities tend to be low, or the products tend to be colored.

It is preferred to select the amount of the reactant (v) so that the molar ratio of the magnesium atom in the reactant (i) to the silicon tetrachloride and/or the alkyl-substituted product of silicon tetrachloride (v) (in a case where two or more such silicon compounds are used, the total amount of such compounds), will be within a range of from 1:1 to 1:100, preferably from 1:3 to 1:50. If the molar ratio is outside this range, the polymerization activities are likely to be low, or it tends to be difficult to obtain a polymer having excellent stereospecificity. With respect to the reaction conditions at the time of obtaining the usually at a temperature within a range of from −50° to 300° C., preferably from 0° to 200° C. for from 0.5 to 50 hours, preferably from 1 to 6 hours, in an inert gas atmosphere under atmospheric pressure or under an elevated pressure. In such case, it is possible to conduct the homogenizing in a short period of time by adding electron-donative compounds similar to the above compound (iii) and/or substances capable of reacting with metal magnesium or capable of forming addition compounds, for example, iodine, mercuric chloride, an alkyl halide and polar substances such as organic acids, alone or in combination as a mixture of two or more of them.

Further, the reaction with the reactant (ii) is conducted usually at a temperature within a range of from −50° to 200° C., preferably from −30° to 150° C. for from 0.2 to 50 hours, preferably from 0.5 to 10 hours in an inert gas atmosphere under atmospheric pressure or under an elevated pressure. The reaction conditions with the reactant (ii) are very important, since they give a decisive role for the control of the particle configurations and the particle sizes of the resulting solid product particles, solid catalyst component particles and the polymer particles obtained by using the solid catalyst.

The solid product particles thus obtained, may be used as they are. However, it is usually advisable to remove remaining unreacted materials and by-products by filtration or decantation and thoroughly wash the solid product particles with the above-mentioned inert organic solvent, before use.

The reaction of the reactant (iii) may directly be conducted to the solid product, or may be conducted in the presence of the reactant (iv), or may be conducted in a divided fashion in multistages.

The reaction of the reactant (iv) may be conducted in a divided fashion in multistages. For this reaction, an α-olefin and/or ethylene of the formula R—CH=CH$_2$ wherein R is a linear or branched substituted or unsubstituted alkyl group having from 1 to 10, particularly from 1 to 8, carbon atoms, may be present, within the scope of the present invention. In such a case, the catalytic activity may be improved, or the amount of the reactant (iv) may be reduced. Further, it is also within the scope of the present invention to conduct the reaction of the reactant (iv) after the reaction of the reactant (v).

The reaction of the reactant (v) is conducted after the reaction of the reactants (iii) and (iv). This reaction may be conducted in a divided fashion in multistages.

The solid catalyst component (A) thus obtained, may be used as it is. However, it is common to remove the remaining unreacted substances and by-products by filtration or decantation, then thoroughly wash it with an inert organic solvent and suspend it in an inert organic solvent for use. It is also possible to use the one which is isolated after washing and then heated under atmospheric pressure or under reduced pressure to remove the inert organic solvent. Further, prior to the main polymerization, a small amount of an organometallic compound component may be added and it is polymerized with a small amount of an α-olefin and/or ethylene of the formula R—CH=CH$_2$ wherein R is a linear or branched substituted or unsubstituted alkyl group having from 1 to 10, particularly from 1 to 8, carbon atoms, so that it can be used in a preliminarily polymerized form.

The solid catalyst component for component (A) thus obtained is used for the polymerization of an olefin in combination with the organometallic compound for component (B) and the electron-donative compound for component (C).

As the organometallic compound for component (B), an organometallic compound composed of a metal such as lithium, magnesium, zinc, tin or aluminum and an organic group, may be mentioned. As the organic group, an alkyl group may be mentioned as a representative. As such an alkyl group, a linear or branched alkyl group having from 1 to 20 carbon atoms, may be employed.

Specifically, n-butyl lithium, diethyl magnesium, diethyl zinc, trimethyl aluminum, triethyl aluminum, tri-i-butyl aluminum, tri-n-butyl aluminum, tri-n-decyl aluminum, tetraethyl tin or tetrabutyl tin, may, for example, be mentioned. It is particularly preferred to use a trialkyl aluminum of the formula AlR$^{10}$$_3$. In the formula, R$^{10}$ is a linear or branched alkyl group having from 1 to 10 carbon atoms. Further, an alkyl metal halide having an alkyl group of from 1 to 20 carbon atoms, such as ethyl aluminum sesquichloride, diethyl aluminum chloride, diisobutyl aluminum chloride or an alkyl metal alkoxide such as diethyl aluminum ethoxide, may also be employed. These organometallic compounds may be used alone or in combination as a mixture of two or more of them.

As the electron-donative compound for component (C), organic esters, oxygen-containing organic compounds of silicon and nitrogen-containing organic compounds are preferred.

As the organic esters, the same compounds as the reactant (iii) to be used for the preparation of the solid catalyst component (A) may be mentioned. Among them, preferred are aliphatic carboxylic esters and aromatic carboxylic esters.

Specifically, the aliphatic carboxylic esters include, for example, ethyl acetate, propyl acetate, butyl acetate, methyl propionate, ethyl propionate and ethyl butylate, having from 2 to 18 carbon atoms. The aromatic carboxylic esters include, for example, methyl benzoate, ethyl benzoate, methyl p-toluate, ethyl p-toluate, methyl anisate and ethyl anisate, having from 8 to 24 carbon atoms. Such organic esters may be used alone, or two or more of them may be mixed or reacted for use.

As the oxygen-containing organic compounds of silicon, oxygen-containing organic compounds of silicon of the formula R$^8$$_s$Si(OR$^9$)$_t$X$_{4-(s+t)}$ may be used. In the formula, each of R$^8$ and R$^9$ is a hydrocarbon group having from 1 to 20, preferably from 1 to 10, carbon atoms, such as a linear or branched alkyl group, a cycloalkyl group, an arylalkyl group, an aryl group or an alkylaryl group, or a hydrogen atom, s and t represent numbers satisfying $0 \leq s \leq 3$, $1 \leq t \leq 4$ and $1 \leq s+t \leq 4$, and X is a halogen atom.

As specific examples, there may be mentioned alkoxysilanes or aryloxysilanes, such as tetramethoxysilane, tetraethoxysilane, tetra-n-propoxysilane, tetra-i propoxysilane, tetra-n-butoxysilane, tetra-i-pentoxysilane, tetra-n-hexoxysilane, tetraphenoxysilane, tetrakis(2-ethylhexoxy)silane, tetrakis(2-ethylbutoxy)silane, tetrakis(2-methoxyethoxy)silane, methyltrimethoxysilane, ethyltrimethoxysilane, n-butyltrimethoxysilane, phenyltrimethoxysilane, vinyltrimethoxysilane, chloromethyltrimethoxysilane, 3-chloropropyltrimethoxysilane, 4-chlorophenyltrimethoxysilane, trimethoxysilane, methyltriethoxysilane, ethyltriethoxysilane, n-propyltriethoxysilane, n-butyltriethoxysilane, phenyltriethoxysilane, vinyltriethoxysilane, 3-aminopropyltriethoxysilane, triethoxysilane, ethyltri-i-propoxysilane, vinyltri-i-propoxysilane, i-pentyltri-n-butoxysilane, methyltri-i-pentoxysilane, ethyltri-i-pentoxysilane, methyltri-n-hexoxysilane, phenyltri-i-pentoxysilane, n-propyltrimethoxysilane, i-propyltrimethoxysilane, i-butyltrimethoxysilane, dimethyldimethoxysilane, methylphenyldimethoxysilane, diphenyldimethoxysilane, methyldimethoxysilane, dimethyldiethoxysilane, diethyldiethoxysilane, diphenyldiethoxysilane, methyldodecyldiethoxysilane, methyloctadecyldiethoxysilane, methylphenyldiethoxysilane, methyldiethoxysilane, butoxysilane, dimethyldi-i-pentoxysilane, diethyldi-i-pentoxysilane, di-i-butyldi-i-pentoxysilane, diphenyldi-i-pentoxysilane, diphenyldi-n-octoxysilane, diisobutyldimethoxysilane, norbornyltrimethoxysilane, norbornenyltrimethoxysilane, isopropyltrimethoxysilane, sec-butyltrimethoxysilane, t-butyltrimethoxysilane, sec-amyltrimethoxysilane, t-amyltrimethoxysilane, cyclohexyltrimethoxysilane, cyclopentyltrimethoxysilane, cyclobutyltrimethoxysilane, norbornyltriethoxysilane, norbornenyltriethoxysilane, isopropyltriethoxysilane, sec-butyltriethoxysilane, t-butyltriethoxysilane, cyclohexyltriethoxysilane, cyclopentyltriethoxysilane, cyclobutyltriethoxysilane, sec-amyltriethoxysilane, t-amyltriethoxysilane, dinorbornyldimethoxysilane, norbornylmethyldimethoxysilane, dinorbornenyldimethoxysilane, norbornenylmethyldimethoxysilane, diisopropyldimethoxysilane, di(sec-butyl)dimethoxysilane, sec-butylmethyldimethoxysilane sec-butylisopropyldimethoxysilane, cyclohexylmethyldimethoxysilane, dicyclohexyldimethoxysilane, t-butylmethyldimethoxysilane, t-butylisopropyldimethoxysilane, di(t-butyl)dimethoxysilane, cyclopentylmethyldimethoxysilane, dicyclopentyldimethoxysilane, cyclobutylmethyldimethoxysilane, dicyclobutyldimethoxysilane, di(t-amyl)dimethoxysilane, (t-amyl)methyldimethoxysilane, t-amyl-i-propyldimethoxysilane, t-butyl-t-amyldimethoxysilane, bis(1,1-diethylpropyl)dimethoxysilane, (1,1-diethylpropyl)methyldimethoxysilane, bis(1,1-dicyclohexylethyl)dimethoxysilane, bis(1-cyclohexyl-1-methylethyl)dimethoxysilane, bis(1-cyclohexylethyl)dimethoxysilane, di(sec-amyl)dimethoxysilane, (sec-amyl)methyldimethoxysilane, diisoamyldimethoxysilane, dicyclopentadienyldimethoxysilane, cyclopentadienylmethyldimethoxysilane, dinorbornyldiethoxysilane, norbornylmethyldiethoxysilane, dinorbornenyldiethoxysilane, norbornenylmethyldiethoxysilane, diisopropyldiethoxysilane, di(sec-butyl)diethoxysilane, sec-butylmethyldiethoxysilane, sec butylisopropyldiethoxysilane, cyclohexylmethyldiethoxysilane, dicyclohexyldiethoxysilane, t-butylmethyldiethoxysilane, t-butyl-isopropyldiethoxysilane, di(t-butyl)diethoxysilane, cyclopentylmethyldiethoxysilane, dicyclopentyldiethoxysilane, cyclobutylmethyldiethoxysilane, dicyclobutyldiethoxysilane, di(t-amyl)diethoxysilane, (t-amyl)methyldiethoxysilane, t-amyl-i-propyldiethoxysilane, t-butyl-t-amyldiethoxysilane, bis(1,1-diethylpropyl)diethoxysilane, (1,1-diethylpropyl)methyldiethoxysilane, bis(1,1-dicyclohexylethyl)diethoxysilane, bis(1-cyclohexyl-1-methylethyl)diethoxysilane, bis(1-cyclohexylethyl)diethoxysilane, di(sec-amyl)diethoxysilane, (sec-amyl)methyldiethoxysilane, diisoamyldiethoxysilane, dicyclopentadienyldiethoxysilane, cyclopentadienylmethyldiethoxysilane, trimethylmethoxysilane, trimethylethoxysilane, dimethylethoxysilane, trimethyl-i-propoxysilane, trimethyl-n-propoxysilane, trimethyl-t-butoxysilane, trimethyl-i-butoxysilane, trimethyl n-butoxysilane, trimethyl-n-pentoxysilane and trimethylphenoxysilane, or haloalkoxysilanes or haloaryloxysilanes such as dichlorodiethoxysilane, dichlorodiphenoxysilane and tribromoethoxysilane. Such oxygen-containing organic compounds of silicon may be used alone, or two or more of them may be mixed or reacted for use.

As the nitrogen-containing organic compounds, compounds having nitrogen atoms in the molecules and having functions as Lewis bases may be mentioned.

Specifically, they include, for example, amide compounds such as acetic N,N-diemthylamide, benzoic N,N-dimethylamide and toluic N,N-diemthylamide, piperidine compounds such as 2,2,6,6-tetramethylpiperidine, 2,6-diisopropylpiperidine, 2,6-diisobutylpiperidine, 2,6-diisobutyl-4-methylpiperidine, 2,2,6-trimethylpiperidine, 2,2,6,6-tetraethylpiperidine, 1,2,2,6,6-pentamethylpiperidine, 2,2,6,6-tetramethyl-4-piperidylbenzoate and bis(2,2,6,6-tetramethyl-4-piperidyl)sebacate, pyridine compounds such as 2,6-diisopropylpyridine, 2,6-diisobutylpyridine and 2-isopropyl-6-methylpyridine, pyrrolidine compounds such as 2,2,5,5-tetramethylpyrrolidine, 2,5-diisopropylpyrrolidine, 2,2,5-trimethylpyrrolidine, 1,2,2,5,5-pentamethylpyrrolidine and 2,5-diisobutylpyrrolidine, amine compounds such as trimethylamine, triethylamine, tributylamine, tribenzylamine, tetramethylethylenediamine, diisopropylethylamine, tert-butyldimethylamine, diphenylamine and di-o-tolylamine, and aniline compounds such as N,N-diethylaniline and N,N-diisopropylaniline. Such nitrogen-containing organic compounds may be used alone or two or more of them may be mixed or reacted for use.

These electron-donative compounds may be used in combination.

The solid catalyst component (A) is used preferably in an amount corresponding to from 0.001 to 2.5 mmol of titanium atom per liter of the reactor. The organometallic compound for component (B) is used usually in an amount corresponding to from 1 to 2,000 mol, preferably from 2 to 500 mol, per gram atom of titanium in the solid catalyst component. The oxygen-containing organic compound of silicon for component (C) is used usually in an amount corresponding to from 0.001 to 50 mol, preferably from 0.01 to 5 mol, per mol of the organometallic compound for component (B).

There is no particular restriction as to the manner of introducing the three components in the present invention. For examples, it is possible to employ a method wherein the components (A), (B) and (C) are separately introduced into the polymerization reactor, or a method wherein the components (A) and (B) are contacted, and then the component (C) is contacted thereto for polymerization, or a method wherein the components (B) and (C) are contacted, and then the solid catalyst component (A) is contacted thereto for polymerization, or a method wherein the components (A), (B) and (C) are preliminarily contacted, followed by polymerization.

The polymerization of an olefin is conducted at a reaction temperature lower than the melting point of the polymer in a gas phase or in a liquid phase. When the polymerization is conducted in a liquid phase, an inert solvent may be used as the reaction medium, although the olefin itself may be used as the reaction medium. As such an inert solvent, any solvent which is commonly employed in this technical field may be employed. Particularly preferred is an alkane or a cycloalkane having from 4 to 20 carbon atoms, such as isobutane, pentane, hexane or cyclohexane.

As the olefin to be polymerized in the method for producing a stereospecific polyolefin according to the present invention, an α-olefin of the formula R—CH=CH$_2$ wherein R is a linear or branched substituted or unsubstituted alkyl group having from 1 to 10, particularly from 1 to 8, carbon atoms, may be mentioned. Specifically, propylene, 1-butene, 1-pentene, 4-methyl-1-pentene or 1-octene, may be mentioned. These olefins may be subjected to not only homopolymerization, but also to random copolymerization or block copolymerization. For the copolymerization, such an α-olefin and ethylene, or two or more of such α-olefins, or such an α-olefin and a diene such as butadiene or isoprene, may be used for polymerization. It is particularly preferred to conduct the polymerization by using propylene, propylene and ethylene, propylene and the above-mentioned α-olefin other than propylene, or propylene and a diene.

There is no particular restriction as to the reaction conditions for polymerization, so long as the polymerization is conducted at a reaction temperature lower than the melting point of the polymer. However, a reaction temperature of from 20° to 100° C. and a pressure of from 2 to 50 kg/cm² G are usually selected.

The reactor to be used for the polymerization step may be any reactor which is commonly used in this particular field. Namely, the polymerization operation may be conducted in a continuous system, in a semi-batch system or in a batch system using a stirring tank type reactor, a fluidized bed reactor or a circulation type reactor. Further, it is also possible to conduct the polymerization in a plurality of steps under different polymerization reaction conditions.

Now, the present invention will be described in further detail with reference to Examples. However, it should be understood that the present invention is by no means restricted by such specific Examples.

In the Examples and Comparative Examples, the melt flow rate (hereinafter referred to simply as MFR) was measured in accordance with JIS K-7210 Condition 14.

The xylene-soluble content (hereinafter referred to simply as $X_y$) as the index for the stereospecificity, was measured as follows. Firstly, 4 g of the polymer was dissolved in 200 ml of xylene, and then left to stand for one hour in a homoiothermal bath at 25° C. The precipitates were filtered off, and the filtrate was recovered. Xylene was evaporated almost completely, followed by vacuum drying to recover the xylene soluble content, which was represented by a percentage to the initial sample.

The catalytic activities are represented by the amount (g) of the polymer formed per g of the solid catalyst component (A).

With respect to the width of the particle size distribution of the polymer particles, the results of the classification of the polymer particles by sieves are plotted on a probability logarithmic paper to find the geometric standard deviation from the approximated straight line in known manner, and the width is expressed in terms of its common logarithm (hereinafter referred to as $\sigma$).

The average particle size is a value obtained by reading the particle size corresponding to the weight accumulated value 50% of the above approximated line.

The content of fine particles is the proportion of fine particles having a particle size of 105 μm or less as represented by weight %.

EXAMPLE 1

(a) Preparation of solid catalyst component (A)

Into a 3 l flask equipped with a stirrer, 15 g (0.62 mol) of metal magnesium powder was charged, and then 0.75 g of iodine, 402 g (3.1 mol) of 2-ethylhexanol, 211 g (0.62 mol) of titanium tetra-n-butoxide and 61.2 g (0.22 mol) of diisobutyl phthalate were added thereto. The mixture was heated to 90° C. and stirred for one hour under sealing with nitrogen. The temperature was further raised to 140° C., and the reaction was conducted for two hours to obtain a homogeneous solution containing magnesium and titanium (Mg-Ti solution).

Into a flask having an internal capacity of 500 ml, the Mg-Ti solution was charged in an amount of 0.066 mol in terms of Mg and cooled to 0° C. Then, a solution prepared by diluting 20.5 g (0.13 mol) of isobutylaluminum dichloride with 157 ml of hexane, was added thereto over a period of two hours. After adding all the amount, the temperature was raised to 70° C. over a period of two hours, whereupon a slurry containing a white solid product, was obtained. The solid product was separated by filtration and washed with hexane.

Into a 1 l glass electromagnetic stirring type autoclave, the slurry containing the white solid product thus obtained, was charged. Then, a solution prepared by diluting 125 g (0.66 mol) of titanium tetrachloride with 125 g of chlorobenzene, was added in its entire amount, then, 7.3 g (0.026 mol) of diisobutyl phthalate was added thereto. The mixture was reacted at 100° C. for 3 hours. The product was subjected to filtration to collect the solid portion. Hexane was added to the product, and washing was conducted thoroughly until any freed titanium compound was no longer detected. To a hexane slurry containing a solid component thus obtained, a solution prepared by diluting 40.0 g (0.24 mol) of silicon tetrachloride with 40.0 g of chlorobenzene, was added in its entire amount, and the mixture was reacted at 100° C. for 30 minutes. Then, the solid portion was collected by filtration and again reacted with the same chlorobenzene solution of silicon tetrachloride at 100° C. for 30 minutes to obtain a solid catalyst component (A). The solid catalyst component was collected by filtration. Hexane was added thereto, and washing was conducted thoroughly until any freed silicon compound was no longer detected, to obtain a slurry of solid catalyst component (A) suspended in hexane. The supernatant was removed and the rest was dried under a nitrogen atmosphere and subjected to elemental analysis, whereby Ti was 1.0% by weight.

(b) Polymerization of propylene

The internal atmosphere of an electromagnetic stirring type autoclave made of stainless steel having an internal capacity of 5 l was replaced thoroughly with nitrogen, and 0.42 mmol of triethylaluminum as the catalyst component (B), 0.10 mmol of diphenyl dimethoxysilane as the catalyst component (C) and 10 mg of the solid catalyst component (A) were sequentially added thereto. The internal pressure of the autoclave was adjusted to 0.1 kg/cm² G, and 0.2 kg/cm² G of hydrogen was added. Then, 2,000 ml of liquefied propylene was added thereto. After initiating the stirring, the temperature was raised to 70° C., and the polymerization was conducted for 90 minutes. After completion of the polymerization reaction, the stirring was stopped and at the same time, unreacted propylene in the system was discharged, and the formed polymer was recovered. As a result, the formed polymer was 198 g, which corresponded to a catalytic activity of 19,800 g/g. Various properties of the polymer particles were measured, whereby MFR was found to be 1.9 g/10 minutes, $X_y$ was found to be 0.4%, the bulk density was found to be 0.47 9/cm³, the average particle size was found to be 1,380 μm, $\sigma$ was found to be 0.12, and the content of fine particles was found to be 0% by weight. Further, the formed polymer particles were spherical.

EXAMPLE 2

A solid catalyst component was prepared in the same manner as in Example 1 (a) except that 34.1 g (0.23 mol) of methyl trichlorosilane was used instead of silicon tetrachloride used as the above component (v) in Example 1. Using the solid catalyst component thus obtained, polymerization of propylene was conducted under the same conditions as in Example 1 (b). As a result, the catalytic activity was found to be 20,600 g/g. Various properties of the polymer particles were measured, whereby MFR was found to be 1.9 g/10 minutes, $X_Y$ was found to be 0.6%, the bulk density was found to be 0.47 g/cm$^3$, the average particle size was found to be 1,370 μm, σ was found to be 0.09, and the content of fine particles was found to be 0% by weight.

EXAMPLE 3

A solid catalyst component (A) was prepared in the same manner as in Example 1 (a) except that 29.0 g (0.22 mol of dimethyl dichlorosilane was used instead of silicon tetrachloride used as the above component (v) in Example 1. Using the solid catalyst component (A) thus obtained, polymerization of propylene was conducted under the same conditions as in Example 1 (b). As a result, the catalytic activity was found to be 21,900 g/g. Various properties of the polymer particles were measured, whereby MFR was found to be 1.4 g/10 minutes, $X_Y$ was found to be 0.6%, the bulk density was found to be 0.48 g/cm$^3$, the average particle size was found to be 1,250 μm, σ was found to be 0.09, and the content of fine particles was found to be 0% by weight.

EXAMPLE 4

Five g of the solid catalyst component obtained in Example 1 was charged into an electromagnetic stirring type autoclave made of glass and having an internal capacity of 1 l, and a solution prepared by diluting 60.4 g (0.32 mol) of titanium tetrachloride with 60.4 g of chlorobenzene, was added. The mixture was reacted at 100° C. for 30 minutes to obtain a solid catalyst component (A). The solid catalyst component (A) was collected by filtration. Hexane was added and washing was conducted thoroughly until any freed titanium compound was no longer detected. Using the solid catalyst component (A) thus obtained, polymerization of propylene was conducted under the same conditions as in Example 1 (b). As a result, the catalytic activity was found to be 32,700 g/g. Various properties of the polymer particles were measured, whereby MFR was found to be 2.4 g/10 min., $X_Y$ was found to be 0.6%, the bulk density was found to be 0.49 g/cm$^3$, the average particle size was found to be 1,700 μm, σ was found to be 0.10, and the content of fine particles was found to be 0% by weight.

EXAMPLE 5

A solid catalyst component (A) was prepared in the same manner as in Example 1 (a) except that 10.0 g (0.067 mol) of ethyl benzoate was used instead of diisobutyl phthalate used as the above component (iii) in Example 1. Using the solid catalyst component (A), polymerization of propylene was conducted under the same condition as in Example 1 (b) except that 0.10 mmol of ethyl p-ethoxybenzoate was used instead of diphenyldimethoxysilane used as catalyst component (C). As a result, the catalytic activity was found to be 10,100 g/g. Various properties of the polymer particles were measured, whereby MFR was found to be 3.7 g/10 min., $X_Y$ was found to be 3.6%, the bulk density was found to be 0.40 g/cm$^3$, the average particle size was found to be 1,090 μm, σ was found to be 0.12, and the content of fine particles was found to be 0% by weight.

EXAMPLE 6

A solid catalyst component (A) was prepared in the same manner as in Example 1 (a) except that 16.8 g (0.13 mol) of ethylaluminum dichloride was used instead of isobutylaluminum dichloride used as the above component (ii) in Example 1. Using the solid catalyst component (A) thus obtained, polymerization of propylene was conducted under the same conditions as in Example 1 (b). As a result, the catalytic activity was found to be 17,900 g/g. Various properties of the polymer particles were measured, whereby MFR was found to be 2.0 g/10 min., $X_Y$ was found to be 0.6%, the bulk density was found to be 0.45 g/cm$^3$, the average particle size was found to be 1,310 μm, σ was found to be 0.14, and the content of fine particles was found to be 0% by weight.

EXAMPLE 7

(a) Preparation of Solid Catalyst Component (A)

Into a 3 l flask equipped with a stirrer, 15 g (0.62 mol) of metal magnesium powder was charged, and then 0.75 g of iodine, 402 g (3.1 mol) of 2-ethylhexanol, 336.4 g (0.62 mol) of tetrakis(2-ethylhexoxy)silane, 126.5 g (0.62 mol) of triisopropoxyaluminum and 61.2 g (0.22 mol) of diisobutyl phthalate were added thereto, and 1 l of decane was further added thereto. The mixture was heated to 90° C. and stirred for one hour under sealing with nitrogen. The temperature was further raised to 140° C., and the reaction was conducted for two hours to obtain a homogeneous solution containing magnesium, titanium and aluminum (Mg-Si-Al solution).

Into a flask having an internal capacity of 500 ml, the Mg-Si-Al solution was charged in an amount of 0.066 mol in terms of Mg and cooled to 0° C.. Then, a solution prepared by diluting 20.5 g (0.13 mol) of isobutylaluminum dichloride with 157 ml of hexane, was added thereto over a period of two hours. After adding all the amount, the temperature was raised to 70° C. over a period of two hours, whereupon a slurry containing a white solid product, was obtained. This solid product was separated by filtration and washed with hexane.

Into an electromagnetic stirring type autoclave having an internal capacity of 1 l, the slurry containing the white solid product thus obtained, was charged. A solution prepared by diluting 125 g (0.66 mol) of titanium tetrachloride with 125 g of chlorobenzene, was added thereto in its entire amount. Then, the temperature was raised to 60° C., and 9.0 g of propylene was supplied over a period of one hour. Then, 7.3 g (0.026 mol) of diisobutyl phthalate was added thereto, and the mixture was reacted at 100° C. for 3 hours. The product was subjected to filtration to collect the solid portion. Hexane was added to the product, and washing was conducted thoroughly until any freed titanium compound was no longer detected. To the hexane slurry containing the solid component thus obtained, a solution prepared by diluting 40.0 g (0.24 mol) of silicon tetrachloride with 40.0 g of chlorobenzene, was added in its entire amount, and the mixture was reacted at 100° C. for 30 minutes. Then, the solid portion was collected by filtration and again reacted with the same chlorobenzene solution of silicon tetrachloride at 100° C. for 30 minutes to obtain a solid catalyst component (A). The solid catalyst component (A) was collected by filtration. Hexane was added, and washing was conducted thoroughly until any freed silicon compound was no longer detected, to obtain a slurry of solid catalyst component (A) suspended in hexane. The supernatant was removed and the rest was dried under a nitrogen atmosphere and subjected to elemental analysis, whereby Ti was found to be 1.0% by weight.

Using the solid catalyst component (A) thus obtained, polymerization of propylene was conducted under the same conditions as in Example 1 (b). As a result, the catalytic activity was found to be 31,000 g/g. Various properties of the polymer particles were measured, whereby MFR was found to be 3.4 g/10 min., $X_Y$ was found to be 0.5%, the bulk density was found to be 0.45 9/cm$^3$, the average particle size was found to be 510 μm, $\sigma$ was found to be 0.10, and the content of fine particles was found to be 0% by weight.

EXAMPLE 8

A solid catalyst component (A) was prepared in the same manner as in Example 7 (a) except that 114.2 g (0.50 mol) of tributoxyborane was used instead of triisopropoxyaluminum used for the preparation of the homogeneous solution for the above component (i) in Example 7. Using the solid catalyst component (A) thus obtained, polymerization of propylene was conducted under the same conditions as in Example 1 (b). As a result, the catalytic activity was found to be 18,500 g/g. Various properties of the polymer particles were measured, whereby MFR was found to be 3.0 g/10 min., $X_Y$ was found to be 0.7%, the bulk density was found to be 0.43 g/cm$^3$, the average particle size was found to be 1,270 μm, $\sigma$ was found to be 0.16, and the content of fine particles was found to be 0% by weight.

EXAMPLE 9

A solid catalyst component (A) was prepared in the same manner as in Example 7 (a) except that a mixture comprising 177.0 g (0.52 mol) of titanium tetra-n-butoxide and 54.5 g (0.10 mol) of tetrakis(2-ethylhexoxy)silane, was used instead of 336.4 g (0.62 mol) of tetrakis(2-ethylhexoxy)silane used in the preparation of the homogeneous solution for the above component (i) in Example 7. Using the solid catalyst component (A) thus obtained, polymerization of propylene was conducted under the same conditions as in Example 1 (b). As a result, the catalytic activity was found to be 22,500 g/g. Various properties of the polymer particles were measured, whereby MFR was found to be 1.6 g/10 min., $X_Y$ was found to be 0.5%, the bulk density was found to be 0.43 g/cm$^3$, the average particle size was found to be 4,100 μm, $\sigma$ was found to be 0.14, and the content of fine particles was found to be 0% by weight.

COMPARATIVE EXAMPLE 1

A solid catalyst component (A) was prepared in the same manner as in Example 1 (a) except that a solution prepared by diluting 46.5 g (0.25 mol) of titanium tetrachloride with 46.5 g of chlorobenzene, was used instead of the chlorobenzene solution of silicon tetrachloride used for the above component (v) in Example 1. Using the solid catalyst component (A) thus obtained, polymerization of propylene was conducted under the same conditions as in Example 1 (b). As a result, the catalytic activity was found to be 33,900 g/g. Various properties of the polymer particles were measured, whereby MFR was found to be 1.5 g/10 min., $X_Y$ was found to be 1.0%, the bulk density was found to be 0.47 g/cm$^3$, the average particle size was found to be 1,160 μm, $\sigma$ was found to be 0.09, and the content of fine particles was found to be 0% by weight.

COMPARATIVE EXAMPLE 2

A solid catalyst component (A) was prepared in the same manner as in Example 1 (a) except that 32.9 g (0.13 mol) of diphenyldichlorosilane was used instead of silicon tetrachloride used for the above component (v) in Example 1. Using the solid catalyst component (A) thus obtained, polymerization of propylene was conducted under the same conditions as in Example 1 (b). As a result, the catalytic activity was found to be 18,300 g/g. Various properties of the polymer particles were measured, whereby MFR was found to be 1.5 g/10 min., $X_Y$ was found to be 1.5%, the bulk density was found to be 0.39 g/cm$^3$, the average particle size was found to be 1,300 μg, $\sigma$ was found to be 0.21, and the content of fine particles was found to be 0% by weight. The stereospecificity was poor.

COMPARATIVE EXAMPLE 3

A solid catalyst component (A) was prepared in the same manner as in Example 1 (a) except that 20.6 g (0.14 mol) of tetraethylsilane was used instead of silicon tetrachloride used as the above component (v) in Example 1. Using the solid catalyst component (A) thus obtained, polymerization of propylene was conducted under the same conditions as in Example 1 (b). As a result, the catalytic activity was 9,800 g/g. Various properties of the polymer particles were measured, whereby MFR was found to be 2.5 g/10 min., $X_Y$ was found to be 1.6%, the bulk density was found to be 0.44 g/cm$^3$, the average particle size was found to be 820 μm, $\sigma$ was found to be 0.12, and the content of fine particles was found to be 0% by weight. The stereospecificity was poor.

COMPARATIVE EXAMPLE 4

A solid catalyst component (A) was prepared in the same manner as in Example 1 (a) except that 29.0 g (0.12 mol) of diphenyldimethoxysilane was used instead of silicon tetrachloride used as the above component (v) in Example 1. Using the solid catalyst component (A) thus obtained, polymerization of propylene was conducted under the same conditions as in Example 1 (b). As a result, only 3.8 g of the polymer was recovered, and the catalytic activity was very low.

COMPARATIVE EXAMPLE 5

A solid catalyst component (A) was prepared in the same manner as in Comparative Example 1 (a) except that 10.0 g (0.067 mol) of ethyl benzoate was used instead of diisobutyl phthalate used as the above component (iii) in Comparative Example 1. Using the solid catalyst component (A) thus obtained, polymerization of propylene was conducted under the same conditions as in Comparative Example 1 (b) except that 0.10 mmol of ethyl p-ethoxybenzoate was used instead of diphenyldimethoxysilane used as catalyst component (C). As a result, the catalytic activity was 13,500 g/g. Various properties of the polymer particles were measured, whereby MFR was found to be 0.7 g/10 min., $X_Y$ was found to be 5.9%, the bulk density was found to be 0.30 g/cm$^3$, the average particle size was found to be 1,320 μm, $\sigma$ was found to be 0.15, and the content of fine particles was found to be 0% by weight. The stereospecificity was poor as compared with Example 5.

COMPARATIVE EXAMPLE 6

A solid catalyst component (A) was prepared in the same manner as in Example 1 (a) except that 125 g (0.66 mol) of titanium tetrachloride was used instead of isobutylaluminum dichloride used as the above component (ii) in Example 1. Using the solid catalyst component (A) thus obtained, polymerization of propylene was conducted under the same conditions as in Example 1 (b). As a result, the catalytic activity was 5,040 g/g. Various properties of the polymer particles were measured, whereby MFR was found to be 4.1 g/10 min., $X_Y$ was found to be 1.8%, the bulk density was found to be 0.19 g/cm$^3$, the average particle size was found to be 450 μm, σ was found to be 0.72, and the content of fine particles was found to be 22% by weight.

COMPARATIVE EXAMPLE 7

A solid catalyst component (A) was prepared in the same manner as in Example 1 (a) except that 168 g (0.99 mol) of silicon tetrachloride was used instead of isobutylaluminum dichloride used as the above component (ii) in Example 1. Using the solid catalyst component (A) thus obtained, polymerization of propylene was conducted under the same conditions as in Example 1 (b). As a result, the catalytic activity was as low as 800 g/g. Various properties of the polymer particles were measured, whereby MFR was found to be 4.3 g/10 min., $X_Y$ was found to be 2.5%, the bulk density was found to be 0.20 g/cm3.

The results of polymerization of propylene in Examples 1 to 7 are shown in Table 1, and the results of polymerization of propylene in Comparative Examples 1 to 7 are shown in Table 2.

since it is not required to remove an atactic polypropylene component.

The second effect is that it is thereby possible to obtain polymer particles having excellent powder properties with a very narrow particle size distribution and little fine particles. Therefore, in a gas phase polymerization, formation of a deposit in the polymerization reactor can be prevented. In a slurry polymerization, separation of the polymer and separation and filtration of the polymer slurry in the drying step can be facilitated, and scattering of fine particles of the polymer out of the system can be prevented. Further, the drying efficiency will be improved due to the improvement in the flowability. Further, in the transfer step, no bridging will form in the silo, and there will be no trouble in the transfer.

The third effect is that the polymerization activities are very high, and it is possible to obtain a polymer which does not require a deashing step intended for the removal of the catalyst residue. By virtue of the high activities, the product will be free from odor or coloring, and no purification of the polymer will be required, such being economically very advantageous.

We claim:

1. A method for producing a stereospecific polyolefin comprising polymerizing an α-olefin having at least three carbon atoms in the presence of a catalyst comprising a transition metal compound and an organometallic compound, wherein said catalyst comprises:

(A) a solid catalyst component prepared by reacting:

TABLE 1

|  | Catalitic activity (g/g cata.) | MFR (g/10 min.) | $X_Y$ (%) | Bulk density (g/cm$^3$) | Average particle size (μm) | σ | Content of fine particles (%) |
|---|---|---|---|---|---|---|---|
| Example 1 | 19800 | 1.9 | 0.4 | 0.47 | 1380 | 0.12 | 0 |
| Example 2 | 20600 | 1.9 | 0.6 | 0.47 | 1370 | 0.09 | 0 |
| Example 3 | 21900 | 1.4 | 0.6 | 0.47 | 1250 | 0.09 | 0 |
| Example 4 | 32700 | 2.4 | 0.6 | 0.49 | 1700 | 0.10 | 0 |
| Example 5 | 10100 | 3.7 | 3.6 | 0.40 | 1090 | 0.12 | 0 |
| Example 6 | 17900 | 2.0 | 0.6 | 0.45 | 1310 | 0.14 | 0 |
| Example 7 | 31000 | 3.4 | 0.5 | 0.45 | 510 | 0.10 | 0 |
| Example 8 | 18500 | 3.0 | 0.7 | 0.43 | 1270 | 0.16 | 0 |
| Example 9 | 22500 | 1.6 | 0.5 | 0.43 | 4100 | 0.14 | 0 |

TABLE 2

|  | Catalitic activity (g/g cata.) | MFR (g/10 min.) | $X_Y$ (%) | Bulk density (g/cm$^3$) | Average particle size (μm) | σ | Content of fine particles (%) |
|---|---|---|---|---|---|---|---|
| Comparative Example 1 | 33900 | 1.5 | 1.0 | 0.47 | 1160 | 0.09 | 0 |
| Comparative Example 2 | 18300 | 1.5 | 1.5 | 0.39 | 1300 | 0.21 | 0 |
| Comparative Example 3 | 9800 | 2.5 | 1.6 | 0.44 | 820 | 0.12 | 0 |
| Comparative Example 4 | 380 | — | — | — | — | — | — |
| Comparative Example 5 | 13500 | 0.7 | 5.9 | 0.30 | 1320 | 0.15 | 0 |
| Comparative Example 6 | 5040 | 4.1 | 1.8 | 0.19 | 450 | 0.72 | 22 |
| Comparative Example 7 | 800 | 4.3 | 2.5 | 0.20 | — | — | — |

According to the present invention, the following effects can be obtained.

The first effect is that it is thereby possible to obtain polymer particles having very high stereospecificity. The method is particularly effective when applied to a gas phase polymerization using no reaction medium, (i) a homogeneous solution prepared by reacting
  (i-1) magnesium and a hydroxylated organic compound, and at least one of
  (i-2) an oxygen-containing organic compound of titanium and
  (i-3) an oxygen-containing organic compound of silicon and at least one of an oxygen-containing organic compound of aluminum and a boron compound, with (ii) at least one aluminum halide compound to obtain a solid product, reacting to this solid product (iii) an electron-donative compound and (iv) a titanium halide compound to obtain a solid component, and further reacting to this solid component (v) silicon tetrachloride and/or an alkyl-substituted product of silicon tetrachloride, (B) at least one member selected from the group consisting of organometallic compounds of Groups IA, IIA, IIB, IIIB and IVB of the Periodic Table, and (C) an electron-donative compound.

2. The method according to claim 1, wherein the hydroxylated organic compound is an alcohol, a phenol or an organic silanol.

3. The method according to claim 1, wherein the oxygen-containing organic compound of titanium for the reactant (i-2) is a compound of the formula $[O_p Ti_u(OR^4)_q]_n$ wherein $R^4$ is a hydrocarbon group having from 1 to 20 carbon atoms, p, q and u are numbers satisfying $p \geq 0$, $q > 0$ and $u \geq 1$, and they are agreeable with the valence of Ti, and n is an integer.

4. The method according to claim 1, wherein the oxygen-containing organic compound of silicon for the reactant (i-3) is a compound of the formula $R^8 Si(OR^9)_t X_{4-(s+t)}$ wherein each of $R^8$ and $R^9$ is a hydrocarbon group having from 1 to 20, or a hydrogen atom, s and t represent numbers satisfying $0 \leq s \leq 3$, $1 \leq t \leq 4$ and $1 \leq s+t \leq 4$, and X is a halogen atom, the oxygen-containing organic compound of aluminum for the reactant (i-3) is a compound of the formula $Al(OR^2)_d X_{3-d}$ wherein $R^2$ is a hydrocarbon group having from 1 to 20 carbon atoms, d is a number of $0 < d \leq 3$, and X is a halogen atom, and the boron compound for the reactant (i-3) is a compound of the formula $R^3_e B(OR^4)_g X_{3-(e+g)}$ wherein each of $R^3$ and $R^4$ is a hydrocarbon group having from 1 to 20, or a hydrogen atom, e and g are numbers satisfying $0 \leq e \leq 3$, $0 \leq g \leq 3$ and $0 \leq e+g \leq 3$, and X is a halogen atom.

5. The method according to claim 1, wherein the aluminum halide compound for the reactant (ii) is a compound of the formula $AlR^5_r X_{3-r}$ wherein $R^5$ is a hydrocarbon group having from 1 to 20 carbon atoms, X is a halogen atom, and r is a number of $0 < r \leq 2$.

6. The method according to claim 1, wherein the reactant (iii) is an ether, an ester, a ketone, a phenol, an amine, an amide, an imine, a nitrile, a phosphine, a phosphite, a stibine, an arsine, a phosphoryl amide or an alcoholate.

7. The method according to claim 1, wherein the reactant (iv) is a compound of the formula $Ti(OR^6)_f X_{4-f}$ wherein $R^6$ is a hydrocarbon group having from 1 to 20 carbon atoms, X is a halogen atom, and f is a number of $0 \leq f < 4$.

8. The method according to claim 1, wherein the reactant (v) is a silicon compound of the formula $R^7_n I_{4-n}$ wherein $R^7$ is an alkyl group having from 1 to 20 carbon atoms, and n is a number of $0 \leq n < 4$.

9. The method according to claim 1, wherein the catalyst component (B) is selected from the group consisting of a trialkyl aluminum of the formula $AlR^{10}_3$ wherein $R^{10}$ is a linear or branched alkyl group having from 1 to 10 carbon atoms, $C_1$-$C_{20}$ alkyl metal halides and $C_1$-$C_{20}$ alkyl metal alkoxides.

10. The method according to claim 1, wherein the electron-donative compound (C) is an organic ester, an oxygen-containing organic compound of silicon, or a nitrogen-containing organic compound.

11. The method according to claim 1, wherein the reactions with the reactant (iv) and (v) are repeated one or more times.

12. The method according to claim 1, wherein prior to the main polymerization, a small amount of an organometallic compound component may be added and it is polymerized with a small amount of an α-olefin and/or ethylene of the formula $R-CH=CH_2$ wherein R is a linear or branched or cyclic substituted or unsubstituted alkyl group having from 1 to 10, particularly from 1 to 8, carbon atoms, or a hydrogen atom, so that it is used in a preliminarily polymerized form.

13. The method according to claim 1, wherein homogeneous solution (i) is prepared by reacting (i-1) magnesium and a hydroxylated organic compound and (i-3) an oxygen-containing organic compound of silicon and at least one of an oxygen-containing organic compound of aluminum and a boron compound.

* * * * *